H. H. WAIT.
LUBRICATION FOR STEAM TURBINES.
APPLICATION FILED MAR. 4, 1918.
1,419,706.
Patented June 13, 1922.
3 SHEETS—SHEET 1.
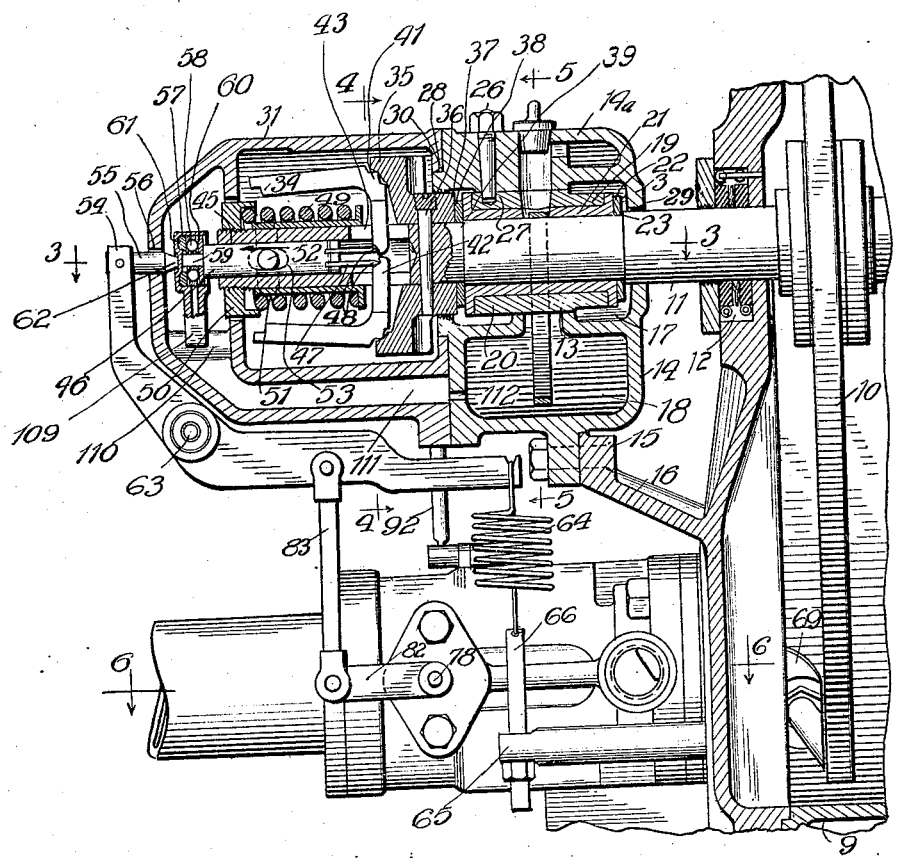
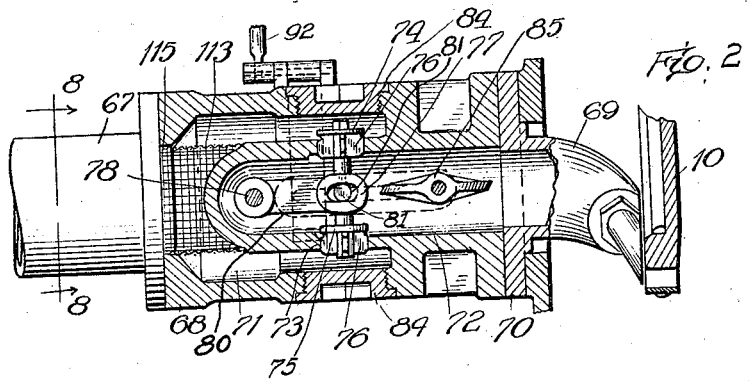

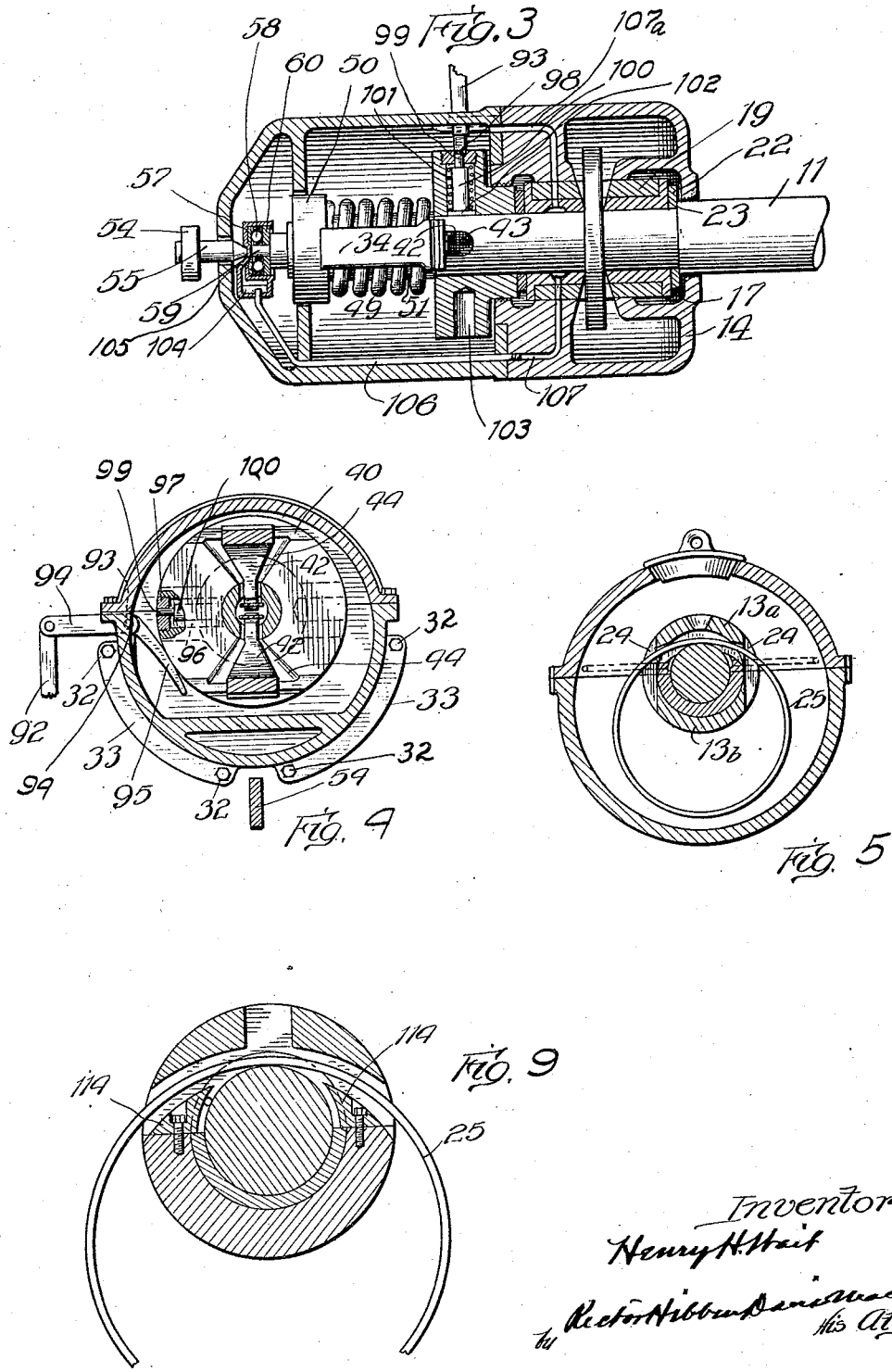

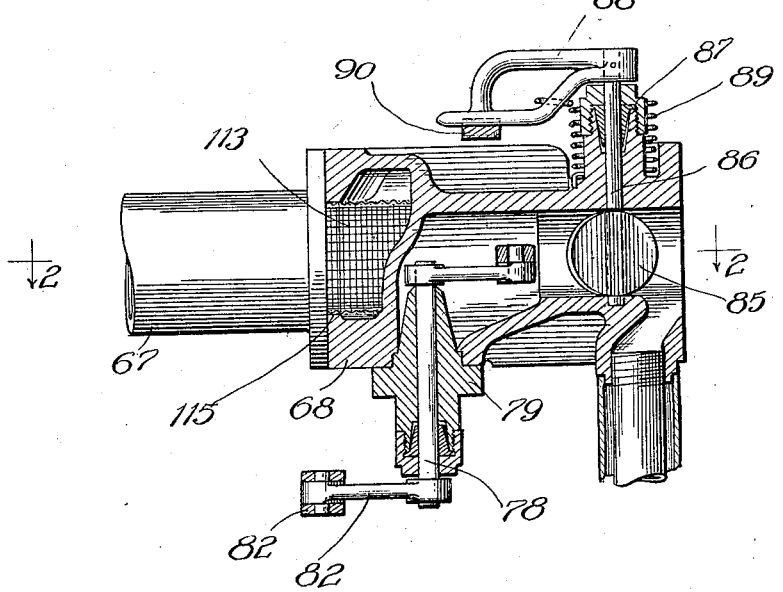
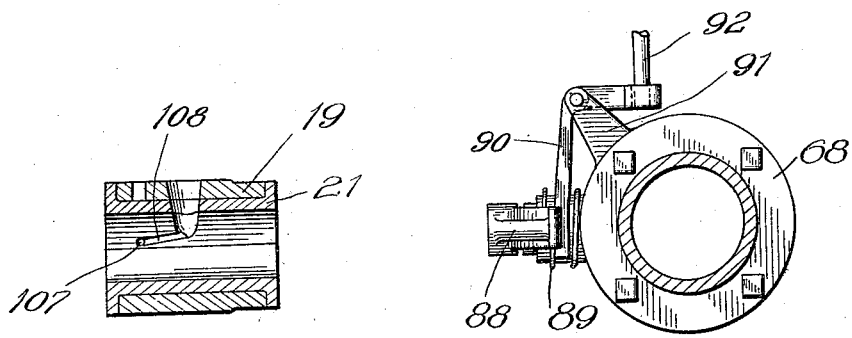

UNITED STATES PATENT OFFICE.

HENRY H. WAIT, OF CHICAGO, ILLINOIS, ASSIGNOR TO MIDWEST ENGINE COMPANY, OF INDIANAPOLIS, INDIANA, A CORPORATION OF INDIANA.

LUBRICATION FOR STEAM TURBINES.

1,419,706.  Specification of Letters Patent.  Patented June 13, 1922.

Application filed March 4, 1918. Serial No. 220,120.

*To all whom it may concern:*

Be it known that I, HENRY H. WAIT, a citizen of the United States, residing at Chicago, in the county of Cook and State of Illinois, have invented certain new and useful Improvements in Lubrication for Steam Turbines, of which the following is a specification.

My invention has to do more particularly with the lubrication of the main bearings of the wheel of a horizontal turbine and of the speed governor mechanism, but as will be apparent from the following description it is also applicable in one or more of its features to many other engines and mechanisms where a horizontal shaft is employed.

In the accompanying drawings I have shown the invention in a preferred form as applied to the horizontal shaft of the horizontal turbine and its speed governor, and in the following specifications described the same in detail. It is to be understood, however, that the specific disclosure is for the purpose of exemplification only, and that the scope of the invention is defined in the following claims in which I have endeavored to distinguish the invention from the prior art so far as known to me without, however, relinquishing or abandoning any portion or feature thereof.

In the accompanying drawings Fig. 1 is a central, vertical section partly broken away of a turbine having my invention applied thereto, parts being shown in elevation; Fig. 2 is a vertical section on the line 2—2 of Fig. 6, showing the steam supply pipe and the valves for controlling the supply of steam; Fig. 3 is a horizontal section on the line 3—3 of Fig. 1, of the turbine bearing upon one side, parts being shown in plan; Fig. 4 is a vertical transverse section upon the line 4—4 of Fig. 1; Fig. 5 a vertical transverse section upon the line 5—5 of Fig. 1; Fig. 6 a horizontal section through the steam supply pipe upon the line 6—6 of Fig. 1; Fig. 7 a vertical section of a detail; Fig. 8 a vertical transverse section upon the line 8—8 of Fig. 2; and Fig. 9 an enlarged detail of a modification in transverse action.

The same reference character is applied to each part wherever it occurs throughout the several views.

The speed governor mechanism in connection with which the invention here claimed is disclosed is not claimed herein but forms the subject-matter of an application Serial No. 118,319, filed by me September 5, 1916.

The turbine casing is shown at 9, and for the purpose of the present invention it, as well as the turbine wheel 10, may be of any form, though I have shown a turbine of the single stage type. The turbine shaft 11 extends through a stuffing box 12 and is supported in a bearing sleeve 13, carried by a bearing housing 14, bolted at 15 to a bracket 16 cast integral with the casing of the turbine. In the present instance, the bearing housing 14 is formed in two sections separated upon the horizontal plane of the axis of the shaft, (Fig. 5) and comprising a bearing chamber proper at 17 which immediately surrounds the shaft and an oil well 18. The bearing sleeve 19 is seated in the bearing chamber and is babbitted at 20 to receive the slightly reduced bearing portion 21 of the turbine shaft. A washer 22 rests against the shoulder 23 and prevents longitudinal motion of the shaft relative to the bearing. The bearing sleeve is formed in two sections 13$^a$, 13$^b$, and is cut away upon its opposite sides to form openings 24, the babbitting being grooved in registry with said openings to permit the application of the lubricating ring 25 which dips into the oil well. (See Figs. 1 and 5.) If the shaft is to be removable the lips of the bearing may be made separate therefrom and secured thereto as at 114. (Fig. 9.) Relative movement of the bearing sleeve is prevented by the taper pin 26 which is located in the top member 14$^a$ of the bearing housing, and extends into an opening 27 in the bearing sleeve.

On the side thereof remote from the turbine, the bearing housing is formed with an opening 28 somewhat larger in diameter than the opening 29 therein adjacent the turbine, and an annular boss 30 surrounds the first said opening and centers the governor casing 31 which fits about said boss and is secured to the bearing housing by bolts 32 passed through flanges 33 on the casing. (Fig. 4). The governor within the casing controls by intermediate means to be presently described, the position of the valve governing the supply of steam to the turbine. It comprises a pair of heavy levers 34 which are rectangular in shape, as shown in Fig. 1, and fulcrumed upon an annular plate 35 which is secured to the shaft of the turbine just within the casing by a pin 36 driven in registering holes in the collar 37 of said plate and the shaft, which collar extends into the opening 28 in the bearing housing. A washer 38 is interposed between the inner end of the collar 37, and a shoulder 39 formed by a slight reduction of the diameter of the turbine shaft and bears upon the end of the babbitted bearing sleeve. As shown in Figs. 1 and 4, the plate 35 is formed with parallel grooves, or recesses 40, formed along diametrically opposite lines on said plate which constitute seats, or fulcra for the pivotal edges 41 of the weight levers 34, and the shorter limbs 42 of the latter are reduced and extend towards each other and into a transverse opening 43 in the shaft, the plate 35 being cut away as at 44 to permit free movement of the levers. The outer end of the shaft is bored at 45, and the bore communicates with the cross-passage 43 referred to above, and in said bore is slidingly mounted a plunger 46, in the inner end of which are secured elastic plates 47, which are formed with knife edges to engage notches 48 in the adjacent ends of the weighted levers. Obviously when the shaft is rotated, carrying with it the plate 35 and the weighted levers, the latter move outward under the centrifugal force, and the inner ends thereof force the plunger 46 in the direction of the arrow in Fig. 1. The outward movement of the plunger, however, is resisted by a spring 49, which is interposed between an adjustable collar 50, screwed upon the end of the shaft, and a sleeve 51 mounted to slide on said shaft, these members being respectively provided with flanges against which the respective ends of the spring bear, and the sliding sleeve is connected to the plunger by a pin or bolt 52 secured at its ends to said sleeve and passing through and snugly fitting an opening in the plunger, the wall of the hollow shaft being formed with elongated openings, or slots 53 to permit of the longitudinal movement of the plunger under the opposed pressures of the spring and weighted levers. The outward movement of the plunger is communicated to a lever 54 which operates the valve as hereinafter described, but in order to avoid undue friction between the lever and the shaft, a bearing is provided which comprises a conical ended pin 55 secured to the shorter arm of said lever extending through a hole 56 in the casing and bearing upon a cup 57 containing a ball bearing 58. The outer end of the plunger is reduced at 59 and surrounded by the bearing and a hardened ring 60, which latter transmits the thrust of the plunger to the balls of the bearing. A second hardened ring 61 is interposed between the cup 50 and said balls to avoid undue wear. The outer face of the cup is depressed and flattened as at 62 to receive the point of the pin 55 and permit such motion between the parts as is necessary.

The lever 54 is pivoted at 63 to the casing, and its longer arm is engaged by an adjusting spring 64, the other end of which is adjustably connected to a bracket 65 by means of a screw bolt 66. The spring 64 serves to maintain the pin 65 in contact with the cup 57, but the main pressure opposing the outward movement of the plunger under centrifugal action is the spring 49 referred to above.

The steam supply pipe 67 connects with the turbine casing through a valve casing 68 and a nozzle stand 69, the flat flange 70 of which is interposed between the valve casing and turbine casing. The valve casing comprises an outer inlet chamber 71 and an inner outlet chamber 72, connected by valve ports 73. A pair of balanced valves 74, 75 controls these ports and are guided therein by wings 76, and rigidly connected together by a crosspiece including a perforated hub, or enlargement 77. Operating connections from the lever 54 to said balanced valve comprise a rotary shaft 78 journaled in a cover plate 79, an arm 80 on the inner end of said shaft carrying a pin 81 engaging the perforation in the valve stem, and an arm 82 on the outer end of said shaft connected by a link 83 with said lever. The operation of this governor mechanism will now be apparent. When the turbine shaft is revolved the centrifugal action upon the weighted levers 34 forces the plunger outward against the pressure of the spring 49, swinging the lever 54, and through the link 83, arm 82, shaft 78 and arm 80, forcing the balanced valves nearer to their seats. Conversely a reduction of the speed of the turbine is accompanied or followed by a movement of the valves away from their seats, the speed of the turbine thus being maintained at a predetermined number of revolutions per minute. Plugs 84 permit access to the balanced valve.

It is desirable in machines of this character to provide means for preventing the wheel from revolving beyond a predetermined speed in addition to the speed regulator to which reference has been made. In the present construction I provide means for completely stopping the turbine when its speed exceeds a certain limit. For this purpose a butterfly valve 85 is journaled within the steam inlet, and the shaft 86 thereof is extended through the wall of the steam conduit, being packed at 87, and provided with a pedal or foot piece 88. A spring 89 tends to throw the valve to closed position; but it is normally maintained in the open position by a bell-crank latch 90 (Fig. 8) pivoted to a lug 91 upon the valve casing. The bell-crank is connected by means of a link 92 to a trip lever 94, which is pivoted at 93 in the governor casing, and the inner end 95 of which extends into said casing adjacent the periphery of the plate 35 heretofore described. (See Fig. 4). The plate 35 is bored to form a chamber 96 which is closed at its outer end by plug 97, perforated at 98 for the passage of a teat 99 upon a plunger 100. The latter is normally maintained in its innermost position by a spring 101 compressed between the plug and a flange 102 upon the plunger. When, however, the speed of rotation of the shaft exceeds a predetermined number of revolutions per minute, the plunger is thrown outward by centrifugal force and the teat engages the inner end 95 of lever 93. The latter, through the link 92 withdraws the latch 90 from engagement with the foot pedal, and thereupon the spring 89 revolves the butterfly valve to closed position, shutting off the supply of steam to the turbine. The head, or plate 35, is bored at 103 opposite the chamber 101 to equalize the weight distribution of the head 35.

In order to properly lubricate the ball bearing 58, which is interposed between the revoluble plunger 46 and the lever 54, I provide the bearing cup 57 with a flange-lip or recess 104, (see Fig. 3) which communicates through a passage 105 with the interior of the cup and with the bearing. Oil is supplied to said lip and cup from the bearing of the shaft by a tube 106, the outlet end of which overhangs said lip and the inlet end of which is connected to a passage 107, (Fig. 3) which extends through the wall of the bearing housing, and the bearing, and communicates with an inclined channel 108 (Fig. 7) formed in the inner face of the Babbitt metal and extending to a point below the oil ring. The oil passage in the bearing is located upon the side thereof toward which the ring turns as it is revolved by the shaft, and therefore the momentum of the oil and its entrainment by adhesion to the shaft carries it into the inclined channel whence it flows through the passage in the casing and the tube 106 to the bearing cup. In the construction shown, in Fig. 3, I have shown a second channel 107ª, but only the channel towards which the shaft turns is used, the two channels being provided so that the wheel may be arranged to revolve in either direction with certain changes which it is not necessary here to consider. The bearing cup 57 is formed with a tail-piece or extension 109 which, during the operation of the machine, bears against a bridge 110 to prevent the rotation of cup 57, and said tail-piece is longitudinally perforated throughout and communicates with the interior of the cup for the purpose of leading away the oil as it is poured through the bearing. From the tail-piece it drips into the channel 111 and passes through the opening 112 back into the oil chamber of the bearing housing.

My invention provides a simple and efficient means for lubricating the bearing of the shaft of the turbine wheel and the described governor bearing providing a continuous flow of oil to these parts, and a circulation of the oil back to the well from which it is taken.

I claim:

1. In a device of the class described and in combination with the rotary shaft, a main bearing thereon, a thrust bearing on the shaft comprising a cup adapted to receive oil, a conduit leading from the main bearing to said cup, and means for collecting oil from said main bearing and directing it to the cup.

2. In a device of the class described, a rotary shaft, a bearing therefor, a secondary bearing, means for conveying oil from the shaft bearing to the secondary bearing comprising a conduit terminating at one end at the secondary bearing and at the other extending through the main bearing to the inner surface thereof, the wall of said conduit formed to intercept oil and direct it into said conduit.

3. In a device of the class described, a shaft, a main bearing therefor, an oil receptacle surrounding said bearing, means for transferring oil from said receptacle to the bearing, a secondary bearing, a conduit leading from the shaft bearing to the secondary bearing for supplying oil thereto, and a conduit for returning oil from the secondary bearing to said oil receptacle.

4. In a device of the class described, a shaft, a main bearing therefor, an oil receptacle surrounding the main bearing, a lubricating ring resting upon the shaft and depending into the oil receptacle, a secondary bearing, a conduit connecting said bearings, and a lip formed on the main bearing for intercepting oil and directing it to the conduit.

5. In a device of the class described, a member rotatable upon a horizontal axis, a member concentric with the axis thereof, a ball bearing between said elements, a cup containing said ball bearing, a flange lip on said cup to receive oil, there being a passage from said flange lip to the interior of the cup, and means for supplying oil to the flange lip.

6. In a device of the class described, a member rotatable upon a horizontal axis, a co-axial member relative to which the first said member rotates, a ball bearing between said members, a cup surrounding the ball bearing and against which one of said members bears, a lip on the cup to receive oil, means for supplying the lip with oil, a tail-piece on said cup, and means to engage the tail-piece to prevent rotation of the cup, there being a passage through said tail-piece communicating with the interior of the cup to carry away oil from the latter.

HENRY H. WAIT.